United States Patent
Musmann et al.

(10) Patent No.: US 6,970,507 B1
(45) Date of Patent: Nov. 29, 2005

(54) METHOD FOR MOTION-COMPENSATED PREDICTION OF MOVING IMAGES AND DEVICE FOR PERFORMING SAID METHOD

(75) Inventors: Hans-Georg Musmann, Salzgitter (DE); Thomas Wedi, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 09/694,211

(22) Filed: Oct. 23, 2000

(30) Foreign Application Priority Data

Oct. 25, 1999 (DE) ................................ 199 51 341

(51) Int. Cl.$^7$ ................ H04N 7/12; H04N 11/02; H04N 11/20; H04N 7/015

(52) U.S. Cl. ............... 375/240.12; 375/240.21; 348/448

(58) Field of Search ............... 348/390.1, 443, 348/458, 581, 452, 448; 375/240.16, 240.26, 375/240.12, 240.21

(56) References Cited

U.S. PATENT DOCUMENTS

| | | | | |
|---|---|---|---|---|
| 5,365,603 A | * | 11/1994 | Karmann | 382/291 |
| 5,754,240 A | * | 5/1998 | Wilson | 375/240.15 |
| 5,832,143 A | * | 11/1998 | Suga et al. | 382/300 |
| 5,914,725 A | * | 6/1999 | MacInnis et al. | 345/441 |
| 6,184,935 B1 | * | 2/2001 | Iaquinto et al. | 348/441 |
| 6,215,525 B1 | * | 4/2001 | Fujino | 348/452 |
| 6,295,089 B1 | * | 9/2001 | Hoang | 348/390.1 |

FOREIGN PATENT DOCUMENTS

| | | |
|---|---|---|
| GB | 2 249 906 A | 5/1992 |
| WO | 99/04574 | 1/1999 |

OTHER PUBLICATIONS

ISO/IEC 14496-2 "Final Draft International Standard of MPEG-4", Atlantic City Oct. 1998, MPEG98/N2502.
ISO/IEC/SC29/WG11: Core Experiemnt on Motion and Aliasing-Compensation Prediction 9P8), Stockholm, Jul. 1997, MPEG97/N1810.
U. Benzler, et al: "Improving Multiresolution Motion Compensating Hybrid Coding by Drift Reduction", Picture Coding Synposium 1996, Mar. 1996, Melbourne.

* cited by examiner

*Primary Examiner*—Chris Kelley
*Assistant Examiner*—Erick Rekstad
(74) *Attorney, Agent, or Firm*—Michael J. Striker

(57) ABSTRACT

Past image point information is also considered as well as local neighboring image point information in the interpolation of a predicted picture for motion-compensated prediction of moving pictures with increased resolution. Motion-compensated image point information is used in the interpolation raster between the scanned values of the reference picture (s'(t−1)) for the predicted picture of increased resolution.

7 Claims, 4 Drawing Sheets

METHOD FOR MOTION-COMPENSATED PREDICTION OF MOVING IMAGES AND DEVICE FOR PERFORMING SAID METHOD

BACKGROUND OF THE INVENTION

1. Field of the Invention

The present invention relates to a method for motion-compensated prediction of moving images or pictures using an interpolation method. It also relates to a device for performing the said method.

2. Prior Art

Standard methods for coding of moving images or pictures (H. 263, MPEG-2, MPEG-4, etc) are based on the principle of the so-called hybridized coding, as described in ISO/IEC 14496-2, "Final Draft International Standard of MPEG-4", Atlantic City, October 1998, MPEG98/N2502. FIG. 1 is a block diagram of a hybrid video-encoder with motion-compensated prediction. The actual picture signal s(t) to be coded with the help of the motion-compensated prediction (motion compensation MC) is predicted from the previously transmitted reference picture s'(t−1). The motion-compensated prediction is performed with the help of a so-called block-wise motion vector d(t), which is determined with the help of a motion estimation (motion estimation ME). It gives the position of the block used for prediction in the already transmitted reference picture s'(t−1) for each block of size 8×8 and/or 16×16 image points of the actual picture. The result of the motion-compensated prediction is the prediction signal ŝ(t). The residual prediction error e(t)=s(t)−ŝ(t) and the motion vector d(t) are coded at the output of the intraframe encoder IE and transmitted. To obtain the reference picture s'(t−1) the intraframe-encoded prediction error e(t) is again decoded (intraframe decoder ID) and added to the prediction signal ŝ(t). With the help of a picture memory $z^{-1}$ the reference picture s'(t−1) is prepared. This reference picture s'(t−1) acts both as an input signal for motion compensation MC and also for motion estimation ME. The motion estimation ME supplies a motion vector for the respective block of image points with which the motion compensation MC is controlled, i.e. image points of a block are moved with the aid of the motion vector, with the aid of the actual picture s(t) and the reference picture s'(t−1).

In the current standardized coding method the amplitude resolution of the motion vector amounts to half an image point. For estimation and compensation thus image points must be interpolated in the picture s'(t−1) between the scanning raster, which corresponds to an increase of the scanning rate of about a factor L=2. For example, in the MPEG-4 verification model, as described in the ISO/IEC 14496-2 reference, these image points are produced by bilinear interpolation filtering of the image points in the scanning raster (see FIG. 2). In the following description the picture interpolated from s'(t−1) is designated with s'u(t−1). The interpolated values "+" are produced by interpolation between the scanned values "O" with the interpolation prescription:

A=(A+B)//2, b=(A+B+C+D)//4, c=(A+C)//2. The symbol "//" represents a rounded off whole number division. The interpolation and thus the motion-compensated prediction is disturbed by different aliasing in the picture signal s(t) and the prediction signal ŝ(t) as described in ISO/IEC/SC29/WG11: "Core Experiment on Motion and Aliasing-compensation Prediction (P8)", Stockholm, July 1997, MPEG97/N1180; in U. Benzler, O. Werner, "Improving Multiresolution Motion Compensating Hybrid Coding by Drift Reduction", Picture Coding Symposium 1996, March 1996, Melbourne; and in WO 99/04574, so that a greater precision for the motion vector using the simple bilinear interpolation permits no additional improvements of coding efficiency. An improved method for making the prediction signal was suggested in ISO/IEC/SC29/WG11: "Core Experiment on Motion and Aliasing-compensation Prediction (P8)", Stockholm, July 1997, MPEG97/N1180 and WO 99/04574 for these reasons. The aliasing signal is reduced in the prediction signal by an N-stage aliasing-reducing "Finite Impulse Response".

SUMMARY OF THE INVENTION

It is an object of the present invention to provide an improved method for motion-prediction of moving images, which does not have the above-described disadvantages.

It is another object of the present invention to provide an apparatus or device for performing this method.

The process for motion-compensated prediction of moving images or pictures using an interpolation method comprises the following steps:

a) considering past image points as well as neighboring image points in the interpolation method;

b) making a motion-compensated picture signal ($\hat{s}_{rri}(t-1)$) using past image point information ($s_{rri}(t-2)$), wherein the image point information is input according to a previously determined motion vector; and c) inserting the image point information of the motion-compensated picture signal ($\hat{s}_{rri}(t-1)$) in an interpolation raster between the image points of a reference picture.

According to the invention the device for performing this method comprises means for increasing the scanning rate of the reference picture, means for a recursive motion compensation of the reference picture with an image memory for past image point information; a merging module for including motion compensated image point information in an interpolation raster between the image points of the reference picture.

With the features of the device and method according to the invention the prediction signals ŝ(t) related to the picture signal s(t) are correctly produced including aliasing. Past image points as well as neighboring local image points are used for the interpolation. A reduction of the prediction error and thus an increase in the coding efficiency results when the method according to the invention is used.

An increased amplitude resolution of the motion vector of up to ¼ or ⅛ of an image point can be successfully employed with the features of the invention and leads to an additional improvement of the coding efficiency. The scanning rate of the already transmitted reference picture must thus be increased about a factor of L=4 and L=8 in the horizontal and vertical directions respectively.

The invention is based on the following understanding and knowledge:

Aliasing occurs digitally in the coded picture signal because of a non-ideal low pass in the reception process. The aliasing has the consequence that the picture signal cannot be perfectly reconstructed by a purely local interpolation in the image points between the scanning raster and the motion-compensated prediction cannot predict the picture signal correctly. A prediction error remains, which must be transmitted in coded form. The size of the prediction error determines the transmission rate and the coding efficiency.

New formulations reduce aliasing in the prediction signal with the help of an FIR filter and improve the coding efficiency as described in WO 99/04574. However since the picture signal to be coded contains the aliasing, the aliasing in the prediction signal will not be reduced, but conforms with that of the picture signal s(t), in order to reduce the size of the additional prediction error.

The invention is based on the following assumptions: If a non-moving analog picture is scanned at the same position at different times, the corresponding scanned values are identical. This is also true for the case in which the scanning frequency is not sufficiently large enough and the scanned picture signal contains aliasing. If the contents of the analog picture signal move about exactly one image point, the corresponding scanned values are similarly identical and thus have the same aliasing signal. This shows that the aliasing does not effect a prediction of the image contents displaced about an integral number of image points. Accordingly the method according to the invention for interpolation of intervening values uses past, i.e. temporally previous scanned, values, in order to reconstruct the actual intervening values. For example, if it is known that the image content moves from picture to picture about ¼ of an image point spacing, one scanning value can be used to reconstruct the image content displaced about ¼ of an image point spacing in the next picture. Since this scanned value is already on the scanning raster at an earlier time point, it contains the correct image signal with the correct aliasing.

Scanned values from the previous or past pictures are used according to the invention in order to reconstruct the actual intervening values based on these prerequisites or assumptions. The filter can thus correctly predict the picture signal including the aliasing. It reduces the prediction error and increases the coding efficiency.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
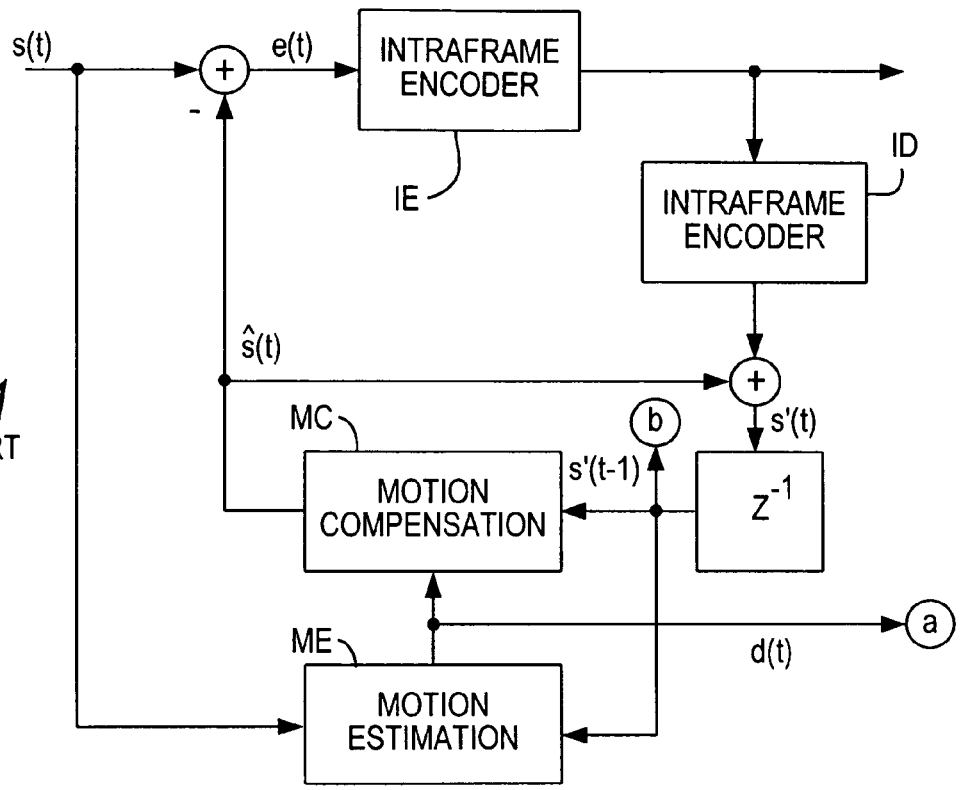
FIG. 1 is a block diagram for a device for motion-compensated prediction of moving images or pictures according to the prior art.
Figure 3:
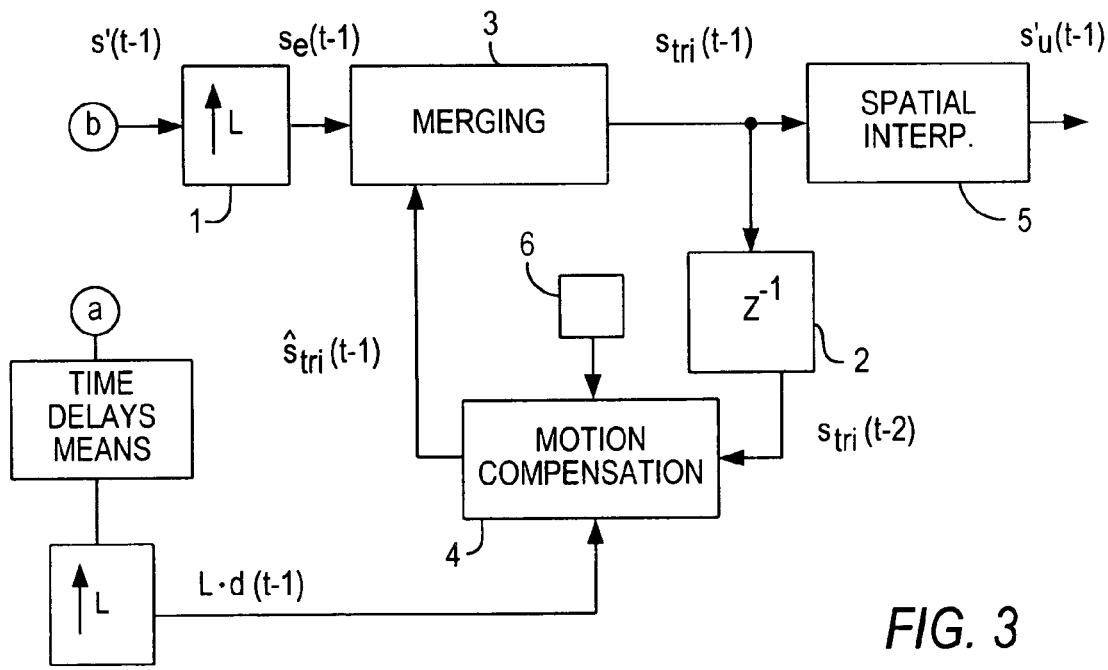
FIG. 3 is a block diagram for an interpolation filter for the device for motion-compensated prediction of moving images or pictures according to the invention.
Figure 2:
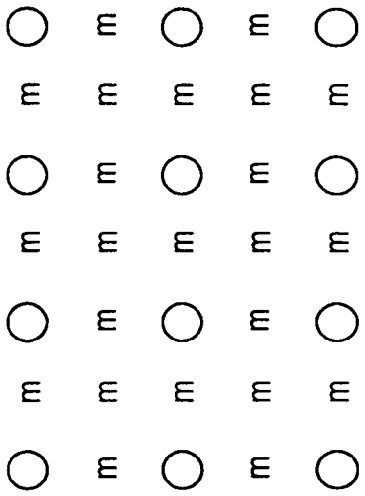
FIG. 2 is a diagram illustrating interpolation of image points in a picture.
Figure 2:
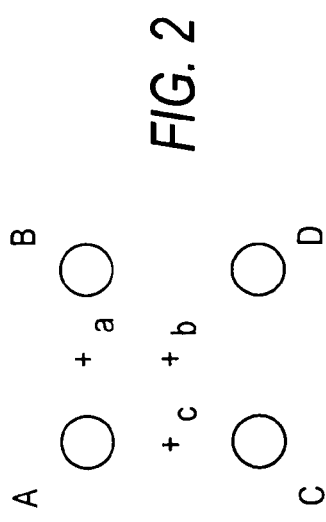
Figure 4:
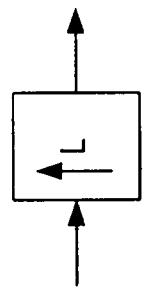
FIG. 4 is a diagram illustrating the increase of the scanning rate due to the method according to the invention for L=2.
Figure 4:
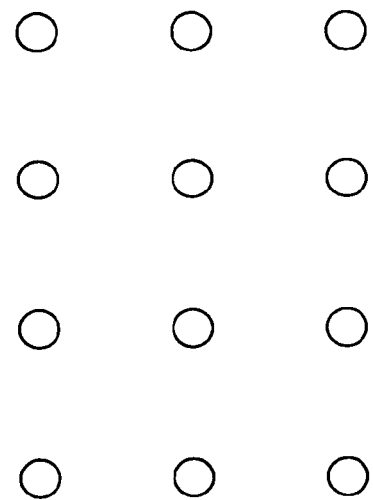

The block diagram of an interpolation filter shown in FIG. 3 is used in the device for performing the method according to the invention. It is built into the prior art device shown in FIG. 1. The symbols used in FIG. 1, for example s'(t−1) for the reference picture, i.e. reference picture signal, are also used in the following description of FIGS. 3 to 7.

In a stage or means 1 the scanning rate of the already transmitted reference picture s'(t−1) is increased by the factor L. The result of the filtering indicated in FIG. 3 is the interpolated image su'(t−1). Since a temporally recursive filter is used for filtering according to FIG. 3, in the following it is designated as a TRI filter (time-recursive interpolation filter).

The TRI filter comprises three stages. The first stage is the so-called expander 1. The second stage or means includes the recursive structure with the motion compensation 4 and the merging module 3. The third stage or means 5 performs a conventional local interpolation (spatial interpolation). These three stages are described in more detail in the following description.

In a first part, the expander, the scanning rate of the input image—reference image—s'(t−1) is increased about a factor L. This occurs because the intervening values of the scanning raster from the reference picture s'(t−1) are filled with marker values m to form an intermediate picture $s_e(t-1)$ (see FIG. 4).

The following equation (1) describes the expander. In this equation x and y represent the local image coordinates.

$$S_e(t-1, x, y) = \{s'(t-1, x/L, y/L), \text{ if } x, y = 0, \pm L, \pm 2L, \ldots, \quad (1)$$
$$= m \text{ otherwise}\}.$$

In the second stage or means the past picture $s_{tri}(t-2)$ is also used in order to replace marked values in the intermediate picture with increased scanning rate $s_e(t-1)$. This occurs with the help of motion compensation 4 of image points of the past picture $s_{tri}(t-2)$, in which the image points are displaced according to the product of the factor L and their already transmitted motion vector d(t−1). Thus it should be noted that the motion vector is multiplied with the scanning rate increase factor L, when a picture with a resolution increased by L is used for compensation. In the merging module 3 the marker values marked in the intermediate picture $s_e(t-1)$ are replaced by the corresponding values from the motion-compensated picture signal $\hat{s}_{tri}(t-1)$, which appear at the output of the motion compensation means 4. The following equation (2) describes the merging process, whose result is the merged picture $s_{tri}(t-1)$. In this equation (2) also x and y represent the local picture or image coordinates.

$$s_{tri}(t-1,x,y)=\{\hat{s}_{tri}(t-1,x,y), \text{ if } s_e(t-1,x,y)=m; \text{ otherwise } s_e(t-1,x,y)\}.\text{tm (2)}$$

Figure 5:
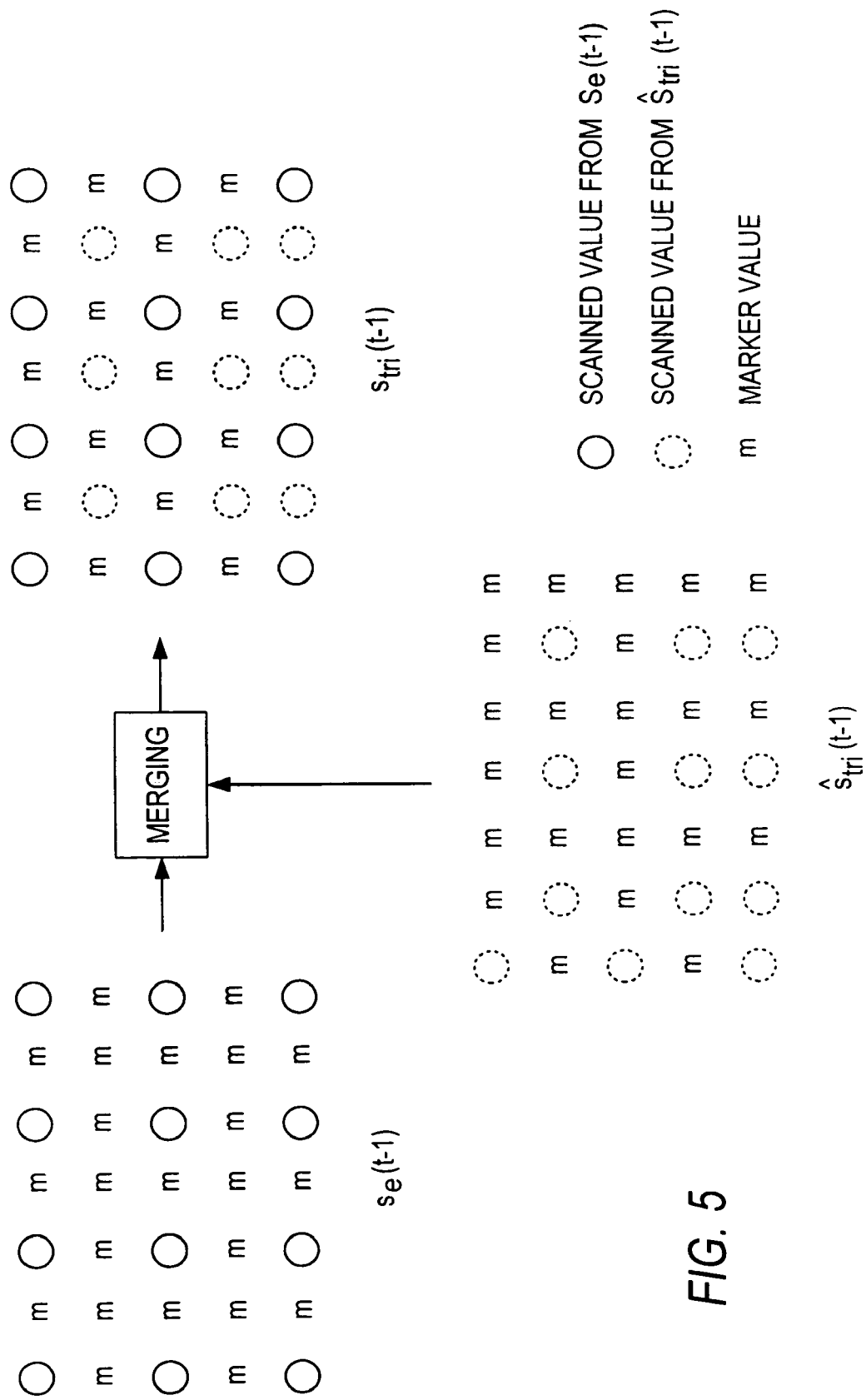
FIG. 5 is a diagram illustrating the operation of the merging module used in the device for performing the method according to the invention.

FIG. 5 illustrates the operation of the merging module 3. The equation (2) and FIG. 5 show that intermediate picture $s_e(t-1)$ and motion-compensated picture $\hat{s}_{tri}(t-1)$ are blended or merged to form a merged picture $s_{tri}(t-1)$. At the position where a marker value m is found in the intermediate picture $s_e(t-1)$, the corresponding image point from the predicted or motion-compensated picture $\hat{s}_{tri}(t-1)$ is used. All remaining values from the intermediate picture $s_e(t-1)$ are taken in to the merged picture $s_{tri}(t-1)$. Thus the scanning values from the motion-compensated picture $\hat{s}_{tri}(t-1)$ are used, in order to interpolate the image points (marker values) in the intermediate picture $s_e(t-1)$.

The third stage or means produces a purely local spatial interpolation 5 according to WO 99/04574 A1, in which the remaining marked values of the picture $s_{tri}(t-1)$ exclusively are interpolated. The result is the interpolated picture s'u(t−1).

The picture $s_{tri}(t-1)$ is intialized with the picture $s_e(t-1)$ at the time point t= 1, at which no picture $s_{tri}(t-2)$ exists. The marked values in the picture $s_{tri}(t-1)$ are reconstructed by a local interpolation. This corresponds to a conventional purely local interpolation.

Based on the recursive structure, in which image points from the past picture $s_{tri}(t-2)$ are used, in order to produce the picture $s_{tri}(t-1)$, an unlimited dwell time of individual image points in the picture memory 6 ($s_{tri}$) required for the motion compensation is possible. In order to prevent image point information from remaining for too long a time in the picture memory 6, a counting index is provided for each image point in the memory, which gives the dwell time of the individual image point information. With the help of this index and a threshold value set at the start of the method image point information, which exceeds a predetermined dwell time in memory, is removed from the picture memory 6. The typical dwell time amounts from three to six of the successive pictures.

The TRI filter, as described in ISO/IEC 14496-2, "Final Draft International Standard of MPEG-4", Atlantic City, October 1998, MPEG98/N2502, was integrated in the existing software of the verification model for the experimental results. Two different modes with different resolutions are supported. In the first case motion vectors with a resolution of a half an image point and a bilinear interpolation are used. In this case the reference method (original code) is designated with MPEG4-hp and the method with the new TRI filter is designated with TRI-hp (hp—half pel). In the second case motion vectors with a resolution of a fourth image point and an aliasing-reducing Wiener filter are used. In this case the reference method is designated with MPEG4-qp and the new method is designated with TRI-qp (qp=quarter pel). For the purely local spatial interpolation in the TRI filter the corresponding local interpolation method uses the reference code.

Figure 6:
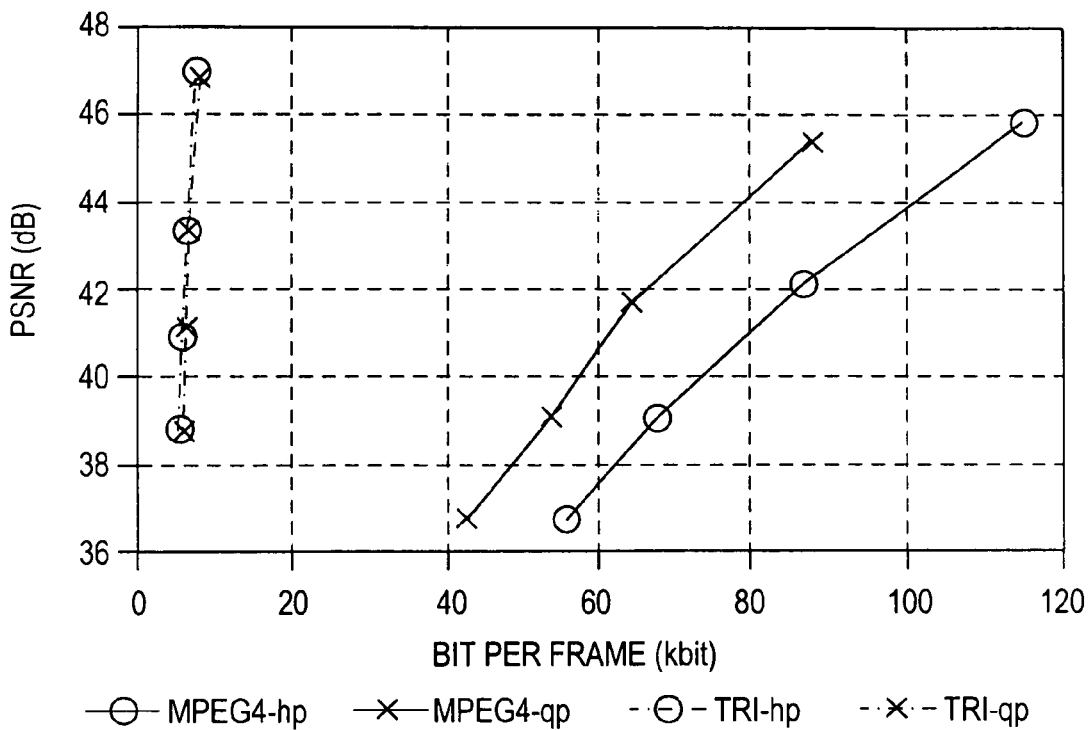
FIG. 6 is a graphical illustration of the experimentally determined rate for synthetic test sequence Syn waves.
Figure 7:
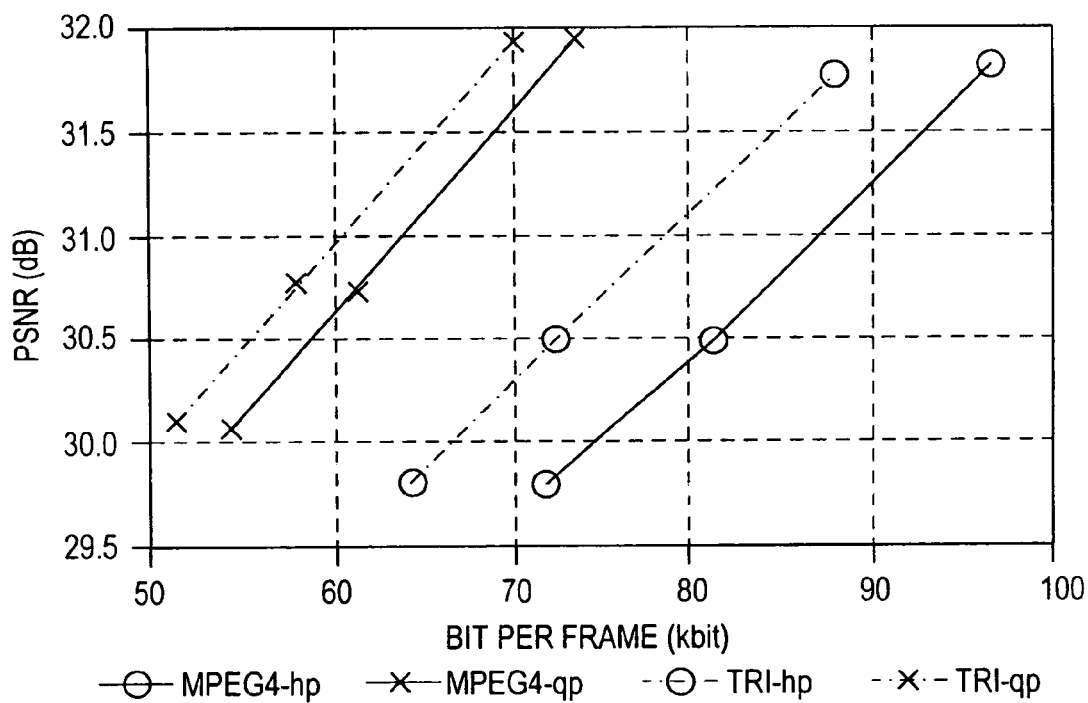
FIG. 7 is a graphical illustration of the experimentally determined rate for the test sequence "mobile & calendar".

For producing the test results a synthetic and a real test sequence was used in FIGS. 6 and 7. The synthetic sequence was produced by scanning two analogous sine signals, in which the frequency of the first sine signal is below and that of the second sine signal is above half the scanning frequency. Accordingly the second sine signal produces aliasing in the scanned picture signal. Further the analogous picture signal is displaced about exactly a half an image point between successive pictures. This displacement can be estimated by the code used without error, so that a remaining prediction error can be fed back into an extended interpolation. This synthetic sequence is designated with Syn waves. With the real test sequence it is a matter of the test sequence "mobile & calender".

The results for the synthetic sequence Syn Waves is illustrated in FIG. 6. Although the picture-to-picture displacement of a half an image point can be correctly estimated by all codes, the reference code with the conventional interpolation filter is not in a position to correctly predict the image signal. Accordingly a considerable data rate must be provided for the coding of the prediction error. The MPEG4-qp coder itself, which operates with an aliasing-reducing Wiener filter, can predicted the picture signal only insufficiently. Accordingly the coder with the TRI filter according to the invention is in a position to predict the picture signal correctly including aliasing, so that a considerably lower data rate is required. The single remaining prediction error is based on the quantization error, which arises in the intra-frame encoder.

In FIG. 7 the results for the real test sequence "Mobile and Calender" are presented. A significant improvement is observed due to the use of the TRI filter according to the invention. An improvement of 0.8 dM has been shown between MPEG4-hp and TRI-hp and an improvement of 0.4 dB has been shown between MPEG4-qp and TRI-qp. The reason for the reduced gain relative to the test sequence Syn waves is because the motion-compensated prediction is disturbed by the displacement estimation error. Also the aliasing signal has no components as large in the total signal as in the synthetic sequence.

The disclosure in German Patent Application 199 51 341.4 of Oct. 25, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for motion-compensated prediction of moving images or pictures using an interpolation method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A process for motion-compensated prediction of moving images or pictures using an interpolation method considering past image points as well as neighboring image points, said process comprising the steps of:
    a) making a motion-compensated picture signal ($\hat{s}_{tri}(t-1)$) using past image point information ($s_{tri}(t-2)$), wherein said past image point information is displaced or shifted to obtain said motion-compensated picture signal ($\hat{s}_{tri}(t-1)$) according to a product of a scanning rate increase factor (L) and a previously determined motion vector (d(t-1));
    b) producing an intermediate picture ($s_e(t-1)$) from a reference picture (s'(t-1)) by increasing scanning rate by said scanning rate increase factor (L) and inserting marker values (m) at intervening points between image points of the reference picture (s'(t-1)) to form an interpolation raster; and
    c) replacing said marker values (m) in said intermediate picture ($s_e(t-1)$) at locations in said intermediate picture where image point information of said motion-compensated picture signal ($\hat{s}_{tri}(t-1)$) is present with said image point information of said motion-compensated picture signal ($\hat{s}_{tri}(t-1)$) and retaining values in said intermediate picture at other locations in said intermediate picture where image point information of said motion-compensated picture signal is not present.

2. The process as defined in claim 1, further comprising replacing said marker values (m) that are not replaced by said image point information of said motion-compensated picture signal ($\hat{s}_{tri}(t-1)$) by locally interpolated image data, thus producing a resulting interpolated picture signal (s'u(t-1)).

3. A device for motion-compensated prediction of moving images or pictures comprising a time recursive interpolation filter;
    wherein said time recursive interpolation filter includes means (1) for increasing a scanning rate of a reference picture (s'(t-1)) by a scanning rate increase factor (L)

and for inserting marker values (m) at intervening points between image points of the reference picture (s'(t−1)) to form an interpolation raster and an intermediate picture signal ($s_e$(t−1));

an image memory (2) for storing past image point information ($s_{tri}$(t−2));

means (4) for making a motion-compensated picture signal ($\hat{s}_{tri}$(t−1)) using said past image point information ($s_{tri}$(t−2)) according to a product of said scanning rate increase factor (L) and a previously determined motion vector (d(t−1)); and a merging module (3) for replacing said marker values (m) in said intermediate picture ($s_e$(t−1)) at locations where image point information of said motion-compensated picture signal ($\hat{s}_{tri}$(t−1)) is present with said image point information of said motion-compensated picture signal ($\hat{s}_{tri}$(t−1)) and retaining values in said intermediate picture at other locations in said intermediate picture where image point information of said motion-compensated picture signal is not present.

4. The device as defined in claim 3, further comprising an interpolation stage (5) for local interpolation at said marker values (m) that are not replaced by said image point information of said motion-compensated picture signal ($\hat{s}_{tri}$(t−1)).

5. The device as defined in claim 3, wherein said means (4) for making a motion-compensated picture signal ($\hat{s}_{tri}$(t−1)) has a picture memory (6) and means for preparing a count index for each newly entered one of said image points in said picture memory (6), and, when one of said image points has a value of said count index corresponding to a predetermined dwell time limit, said one of said image points is removed from said picture memory (6).

6. A process for motion-compensated prediction of moving images or pictures using an interpolation method considering past image points as well as neighboring image points, said process comprising the steps of:

a) producing an intermediate picture ($s_e$(t−1)) from a reference picture (s'(t−1)) by increasing scanning rate by a scanning rate increase factor (L) and inserting marker values (m) at intervening points between image points of the reference picture (s'(t−1)) to form an interpolation raster;

b) making a motion-compensated picture signal ($\hat{s}_{tri}$(t−1)) using past image point information ($s_{tri}$(t−2)), wherein said past image point information is displaced or shifted to obtain said motion-compensated picture signal ($\hat{s}_{tri}$(t−1)) according to a product of said scanning rate increase factor (L) and a previously determined motion vector (d(t−1)); and c) replacing said marker values (m) in said intermediate picture ($s_e$(t−1)) at locations in said intermediate picture where image point information of said motion-compensated picture signal ($\hat{s}_{tri}$(t−1)) is present with said image point information of said motion-compensated picture signal ($\hat{s}_{tri}$(t−1)) and retaining values in said intermediate picture at other locations in said intermediate picture where image point information of said motion-compensated picture signal is not present.

7. The process as defined in claim 6, further comprising replacing said marker values (m) that are not replaced by said image point information of said motion-compensated picture signal ($\hat{s}_{tri}$(t−1)) by locally interpolated image data, said locally interpolated image data being derived from said image point information of said motion-compensated picture signal and the image points of the reference picture, thus producing a resulting interpolated picture signal ((s'u (t−1)).

* * * * *